Patented Apr. 29, 1930

1,756,331

UNITED STATES PATENT OFFICE

HARRY P. BASSETT, OF CYNTHIANA, KENTUCKY

PROCESS OF RECOVERING VOLATILE PLASTICIZERS FROM CELLULOID AND THE LIKE

No Drawing.      Application filed February 10, 1927. Serial No. 167,380.

This invention relates to the recovery of camphor and similar volatile plasticizers from nitro-cellulose products containing such materials and in its preferred embodiment relates particularly to the recovery of camphor from celluloid scrap.

The principal object of this invention is to provide a simple and economical process for recovering camphor and similar volatile plasticizers from nitro-cellulose products containing such materials without destroying or deleteriously affecting the nitro-cellulose present in such products.

Another object of this invention is to provide a process of treating scraps of celluloid and celluloid products to remove and recover the camphor or other volatile plasticizers employed in the preparation of such products and to recover the nitro-cellulose present in the form of true, unaltered nitro-cellulose suitable for use in the preparation of lacquers and the like.

Other objects and advantages of the invention will become apparent during the course of the following description.

As is well known, in the manufacture of certain nitro-cellulose products, such as celluloid into articles of commerce there is a considerable amount of such products left in the form of scrap or waste. This scrap contains substantial amounts of camphor or other similar volatile plasticizers as well as nitro-cellulose and it has been proposed heretofore to recover such plasticizers from the scrap by heating the scraps in the presence of caustic soda. While the camphor or other plasticizers may be recovered by this method the nitro-cellulose is either destroyed or so deleteriously affected that it is unsuitable for further use in manufacturing processes.

I have discovered that camphor and similar volatile plasticizers can be recovered from nitro-cellulose products of the character referred to without the destruction or injury of the nitro-cellulose by passing a current of steam into a body of such material immersed in water maintained at an elevated temperature and conducting off and condensing the volatile products. By this method substantially all of the plasticizing material present is removed and recovered without injury to the nitro-cellulose. This method is relatively inexpensive and does not require elaborate or costly apparatus.

In the preferred practice of my process the scrap material to be treated is introduced into a suitable closed container, such as an autoclave, and covered with water. The body of water and scrap material in the autoclave is raised to an elevated temperature and steam is introduced thereinto. I have found that my process produces the most favorable results if a pressure in excess of atmospheric pressure is maintained in the autoclave and the water therein maintained at boiling temperature, such temperature, of course, varying with the amount of pressure employed. In practice a pressure of from five to twenty-five pounds per square inch will be found to be the most suitable for producing the desired result. Under the conditions outlined substantially all of the camphor or other plasticizers present is distilled off and recovered by condensing such materials in a suitable condensing apparatus.

A substantial measure of success can be obtained in the practice of my process without maintaining super-atmospheric pressure in the autoclave. For example, the plasticizers can be removed by treating the scrap material with steam at approximately 100° C. at atmospheric pressure. However, at such temperature and pressure the plasticizing materials distill off relatively slowly. However, these materials will distill off readily at this temperature and pressure if a weak organic salt of a strong base, such as the acetate, propionate or butyrate of an alkali metal, such as sodium or potassium, and preferably sodium acetate, is added to the water in the autoclave.

I may with some small measure of practical success treat the scrap without first immersing it in water but this course is not recommended.

After treating the scrap in the manner described the nitro-cellulose will be left in the autoclave in the form of a commercial nitro-cotton.

It will be understood that the weak organic salts of strong bases employed and boiling at superatmospheric pressure are ionizing influences which serve to increase the rapidity with which the volatile plasticizers are distilled off from the material under treatment.

The term "celluloid" as it occurs in the specification and claims is used in a broad sense and is intended to cover those nitro-cellulose products commonly known as celluloid, fiberloid and the like.

While I have described in detail the preferred practice of my process it is to be understood that the details of procedure outlined may be widely varied without departing from the spirit of the invention or the scope of the subjoined claims.

I claim:

1. The herein described process of removing and recovering volatile plasticizers from celluloid and the like which comprises immersing the material to be treated in water containing a weak organic salt of a strong base, passing a current of steam therethrough to drive off the volatile plasticizing material present and recovering the volatile products driven off.

2. The herein described process of removing and recovering volatile plasticizers from celluloid and the like which comprises immersing the material to be treated in water containing a weak organic salt of a strong base, maintaining the water at boiling temperature, passing a current of steam therethrough to drive off the volatile plasticizing material present, and recovering the volatile products driven off.

3. The herein described process of removing and recovering volatile plasticizers from celluloid and the like which comprises immersing the material to be treated in water containing sodium acetate, maintaining the water at boiling temperature, passing a current of steam therethrough to drive off the volatile plasticizing material present, and recovering the volatile products driven off.

4. The herein described process of removing and recovering volatile plasticizers from celluloid and the like which comprises treating under super-atmospheric pressure and in the presence of a weak organic salt of a strong base the material under treatment with a current of steam to drive off the volatile plasticizing material present, and recovering such volatile plasticizing material.

5. The herein described process of removing and recovering volatile plasticizers from celluloid and the like which comprises immersing the material to be treated in water, maintaining the water under super-atmospheric pressure and at boiling temperature, passing a current of steam therethrough to drive off the volatile plasticizing material present, and recovering the volatile products driven off.

6. In the herein described process of removing and recovering volatile plasticizers from celluloid and the like, the steps of subjecting the material to be treated to an ionizing influence which has substantially no decomposing or modifying action on nitro-cellulose, and passing a current of steam therethrough.

In testimony whereof I affix my signature.

HARRY P. BASSETT.